(No Model.)
E. & W. C. MENTZ.
APPARATUS FOR DRAINING AND VENTILATING STORES, &c.
No. 272,570. Patented Feb. 20, 1883.
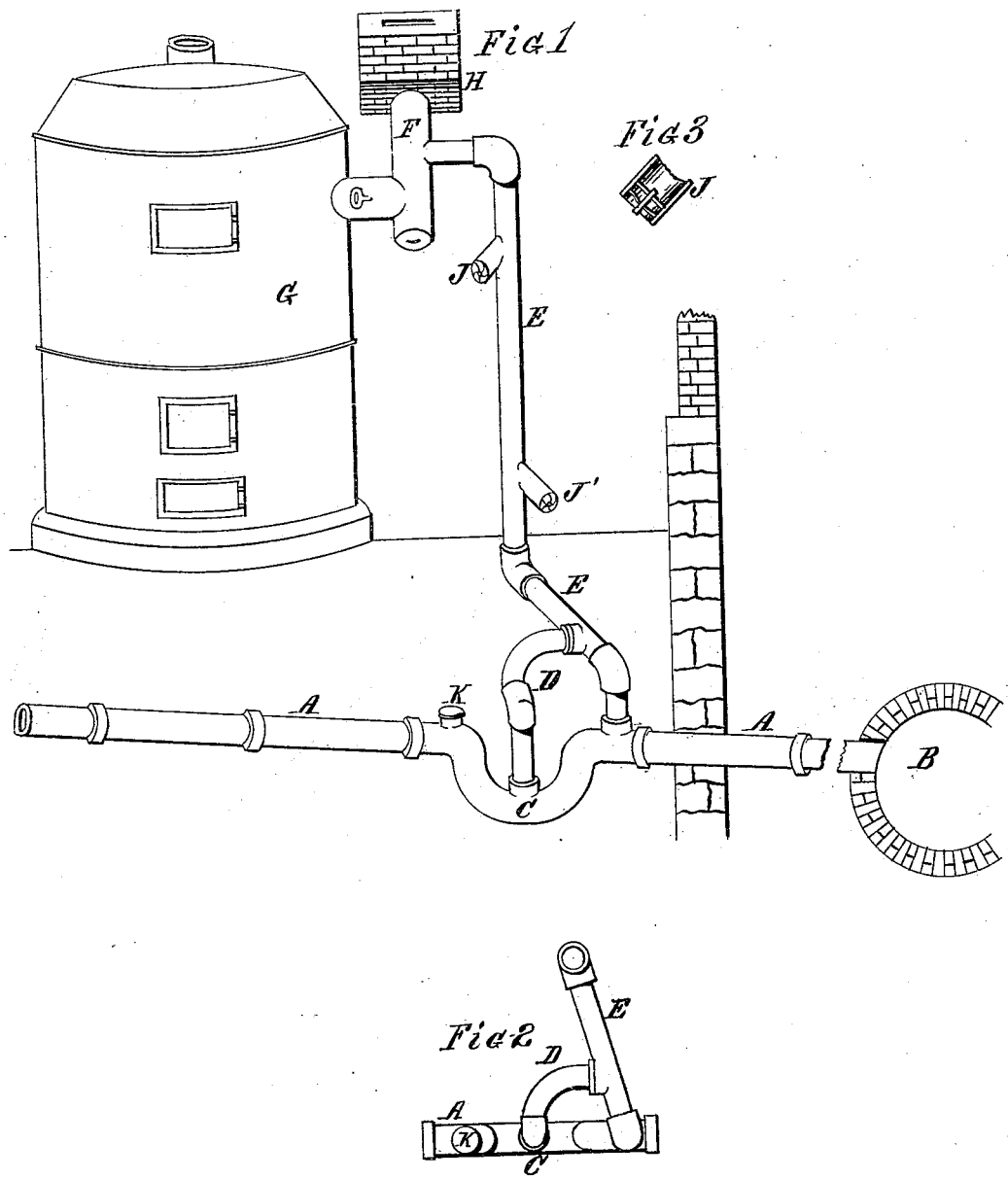
Witnesses.
Inventors.

UNITED STATES PATENT OFFICE.

EDWARD MENTZ AND WILLIAM C. MENTZ, OF PHILADELPHIA, PA.

APPARATUS FOR DRAINING AND VENTILATING STORES, &c.

SPECIFICATION forming part of Letters Patent No. 272,570, dated February 20, 1883.

Application filed November 3, 1882. (No model.)

*To all whom it may concern:*

Be it known that we, EDWARD MENTZ and WILLIAM C. MENTZ, citizens of the United States, residing at Philadelphia, in the county of Philadelphia and State of Pennsylvania, have invented certain new and useful Improvements in Apparatus for Draining and Ventilating Stores, Dwellings, Cellars, and Water-Closets; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to drain-pipes for all kinds of stores, dwellings, cellars, and water-closets.

The object of our invention is to provide a system of pipes, traps, and flues, in connection with a natural current or draft of air that will not only carry off the foul air and gases, but will also effectually prevent the entrance from the sewer of the noxious gases by diverting said noxious gases into the pipes or chimney-flues of the heaters, stoves, or ranges of said stores and dwellings, and conducting them (the said noxious gases) through said pipes and chimney-flues above the roofs of the houses and into the atmosphere.

The invention consists in the arrangement of a pipe connecting with and leading from the main drain-pipe to the smoke-pipe of the heater or direct to the chimney or flue of heater, stove, or range. It also consists in a curved pipe connecting with the center of the trap and leading into the pipe that conducts the sewer-gas to the flues or chimneys; and it finally consists in the short pipes or nozzles on the side of the pipe leading into the flue or chimney, which short pipes or nozzles are provided with revolving ventilators.

In the accompanying drawings, in which similar letters of reference indicate like parts, Figure 1 is a perspective of a device embodying our invention. Fig. 2 is a plan of the trap, the curved pipe and section of main drain-pipe, and also section of pipe leading to flue of heater. Fig. 3 is a section of pipe E and nozzle J.

The main drain-pipe A leads through the trap C into the sewer B. The escape-pipe E connects with the main drain-pipe A and with the heater-flue F, leading into the chimney H. The curved pipe D connects with the trap C and leads into the pipe E. The chimney H carries the gas and smoke above the roof. The nozzles J J' connect to the pipe E, Fig. 1. On the top of the trap C is the hand-hole K, Fig. 2. The nozzle J, attached to the section of pipe E, shows the revolving ventilator, Fig. 3.

The operation of the device is as follows: The sewer-gas entering from the sewer B through the main drain-pipe A is intercepted and drawn through the pipe E into the smoke-flue of the heater G and chimney H. The curved pipe D relieves the pressure in the trap C and conducts into the pipe E the gas that may pass the connection of the pipe E with the main drain-pipe A. The upward draft is assisted by the nozzles J J', which at the same time serve to ventilate the cellar or other apartments in which they may be located.

What we claim is—

1. The pipe E, provided with the nozzles J and J', in combination with the heater-flue F, main drain-pipe A, curved pipe D, and trap C, substantially as and for the purpose specified.

2. The nozzles J and J', having revolving ventilators located therein, in combination with the pipes E and D, main drain-pipe A, and trap C, substantially as and for the purpose specified.

In testimony whereof we have affixed our signatures in presence of two witnesses.

EDWARD MENTZ.
WILLIAM C. MENTZ.

Witnesses:
A. H. MORGAN,
CHAS. W. MORGAN.